United States Patent [19]

David et al.

[11] Patent Number: 4,601,866

[45] Date of Patent: Jul. 22, 1986

[54] PROCESS FOR TABLET PRODUCTION

[75] Inventors: Agoston David; Ferenc Kovacs; Janos Pogany, all of Budapest, Hungary

[73] Assignee: Chinoin, Budapest, Hungary

[21] Appl. No.: 567,789

[22] Filed: Jan. 3, 1984

Related U.S. Application Data

[63] Continuation-in-part of Ser. No. 95,412, Nov. 19, 1979, abandoned.

[51] Int. Cl.[4] .............................................. B29C 59/02

[52] U.S. Cl. .................................... 264/109; 264/122; 264/123; 425/116; 425/128

[58] Field of Search ............... 264/109, 325, 122, 123, 264/327, 120; 425/116, 128, 107

[56] References Cited

U.S. PATENT DOCUMENTS

| | | | |
|---|---|---|---|
| 2,235,324 | 3/1941 | Moreland | 264/327 |
| 2,639,465 | 5/1953 | Green et al. | 425/445 |
| 2,735,380 | 2/1956 | Bowes | 425/107 |
| 2,841,528 | 7/1958 | Mylre | 264/109 |
| 2,921,339 | 1/1960 | Pitzer | 264/109 |
| 2,992,729 | 7/1961 | Curtius | 425/128 |
| 3,255,716 | 6/1966 | Knoechel | 264/40.4 |
| 3,840,631 | 10/1974 | Alexander, Jr. | 264/109 |
| 3,846,522 | 11/1974 | Goldman | 264/325 |
| 3,849,041 | 11/1974 | Knapp | 425/128 |
| 4,030,868 | 6/1977 | Williams | 264/109 |
| 4,094,897 | 6/1978 | Nagasawa et al. | 264/325 |
| 4,173,610 | 11/1979 | Huller et al. | 264/109 |

*Primary Examiner*—Donald Czaja
*Assistant Examiner*—MaryLynn Fertig
*Attorney, Agent, or Firm*—Stiefel, Gross, Kurland & Pavane

[57] ABSTRACT

This invention relates to a process and an apparatus for producing tablets of good quality with minimal waste by compressing granulated matter at a regulated temperature. An important advantage of the invention is that it permits direct tabletting of active ingredients without the need to include additives in the tablets.

2 Claims, 8 Drawing Figures

FIG. 6a
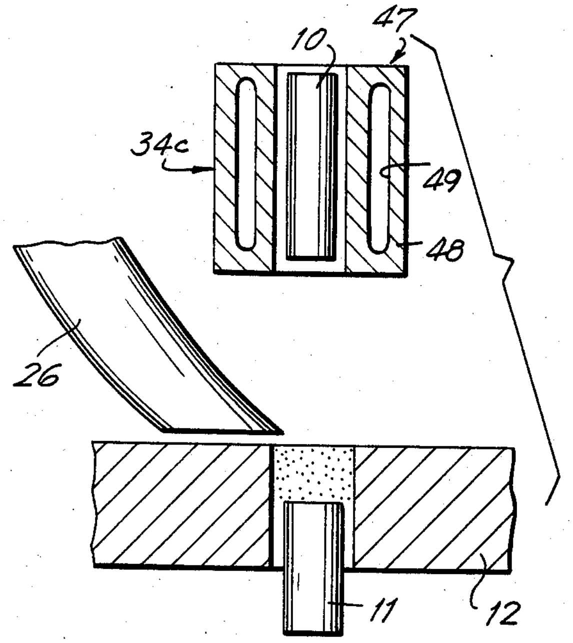
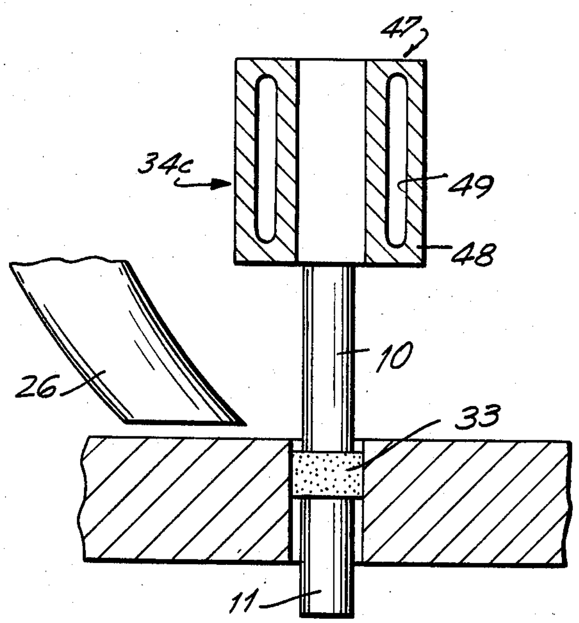
FIG. 6b

PROCESS FOR TABLET PRODUCTION

BACKGROUND OF THE INVENTION

This application is a continuation-in-part of Ser. No. 095,412, filed Nov. 19, 1979, now abandoned.

The present invention relates to a process for the production of tablets and to a tabletting machine for execution of the process.

It is well known that tablets used in the pharmaceutical, food and fodder industries are mechanically produced, by processes which include material preparation, granulation, compression and subsequent checking and storage. The most critical part of the operation is compression, which directly affects the physical qualitites (hardness, friability), chemical qualities (preservation of the active ingredients) and biological qualitites (therapeutic effect, bioavailability) of the tablets.

A common problem with known tablet compression processes is that there is no guarantee that the desired physical, chemical and biological qualities will be attained, and therefore production waste may reach levels as high as 20–30%.

Extensive research has been conducted to eliminate the above deficiencies, but this research has been aimed primarily at the physics of the tablet pressing process. See, e.g., T. Higuchi in his article on pages 685–689 of Volume 43/1954 of the J. Am. Pharm. Ass., published in the U.S.A., describing the variation of the tablet volume as a function of the compressive force and the pressure distribution within the tablet Also, see R. Hunttenrauch and V. Dietz reporting the effect of compression velocity on the quality of the tablet on page 47 of Volume 32/1976 of "Pharmazie", published in the German Democratic Republic. However, this research work has not successfully eliminated the problems mentioned before.

Practical experience has shown that the usually prepared granulated matter having a particular moisture content is relatively well tabletted at the operating temperature of the tabletting machine. However, when the moisture content increases even in the slightest degree, the granulated matter sticks to the die, and pressing of the tablet becomes very difficult, or the resultant tablet is deformed. Alternatively, if the moisture content of the granulated matter is slightly less than the optimal value, the resulting tablet undesirably splits into plates.

With reference to storage and date of expiration of the tablets, it is particularly important to note that a higher than optimal moisture content will generally cause the stability of the tablets to decrease logarithmically. Therefore, it is necessary to keep the moisture content at the optimal value or lower during storage.

Another deficiency of the known tabletting processes is that such processes are not suitable for the so-called "direct" tabletting of active ingredients, i.e., tabletting of active ingredients, free of any additives. Examples of such materials free from additives are the soluble active ingredients which are used as aseptic drugs which are administered in the form of an injection. In such injections, the active ingredients comprise no more than a few percent of the total, the remainder being a liquid carrier. At present, these active ingredients are dispensed as a powder contained in ampoules, which powder must be dissolved in distilled water in order to prepare the injectable solution. In view of the small dosage involved (e.g., 10 mg) and the required accuracy of the dose, it would be preferable to dispense these active ingredients in the form of sterile soluble tablets, rather than as a powder, thereby guaranteeing precise dosages.

Various eccentric and circulatory tabletting machines are presently used. These machines have a number of common characteristics, such as having uniaxial and axially driven upper and lower punches, dies, and granulated matter feeding mechanisms.

The present invention is aimed at the improvement of known tabletting machines and tabletting processes, whereby tablets of uniform quality can be produced with minimal waste. The invention is also aimed at a process whereby active ingredients, without additives, can be tabletted directly.

The basic principle underlying the invention is the realization that tablet pressing can be regarded, in some sense, as a non-stoichiometric chemical process. For the first time it has been realized that the tabletting process can be correlated with thermodynamic potential functions, calculated with extensive parameters dependent upon the composition of the system. Hence, it has now been realized that the quality of tablets depends upon the temperature at which tabletting is carried out. Thus, the deficiencies of the tabletting processes can be overcome, provided that the starting materials (organic or inorganic, single or multiple components) are pressed into tablet form while keeping the granulated charge at a predetermined temperature wherein the predetermined temperature is in the range of about 15°–50° C.

In accordance with the present invention, the new tabletting process can be performed with a tabletting machine having upper and lower dies, a matrix, a granulated matter feeding mechanism and a temperature regulating unit for keeping the temperature of the granulated matter during pressing within the optimal temperature range of about 15°–50° C.

The temperature regulation can be accomplished, for example, by various means and methods, such as by providing a temperature regulating unit having channels in the matrix which contain a thermal medium of adjustable temperature. Alternatively, electrical heating wire of adjustable temperature may be arranged in the channels of the matrix to regulate the pressing temperature.

In another possible embodiment, the temperature regulating unit has a heating or cooling unit of adjustable temperature surrounding at least the upper portion of the upper die, thus providing a simple heat exchange to regulate the pressing temperature.

In yet another possible embodiment, the temperature regulating unit has a chamber surrounding the entire tabletting machine and this chamber is connected to a heating or cooling unit of adjustable temperature. In this way, the ambient temperature of the tabletting machine is controlled in a simple way, and, through heat exchange, the temperature of the granulated matter during pressing is also controlled.

The invention is described in detail below based on the drawings showing actual models of the tabletting machine as described in the invention.

BRIEF DESCRIPTION OF THE DRAWINGS

FIGS. 6A and 6B are diagrammatic vertical sections of additional embodiments for regulating the temperature of the machine of FIG. 1

DESCRIPTION OF THE PREFERRED EMBODIMENTS

Figure 1:
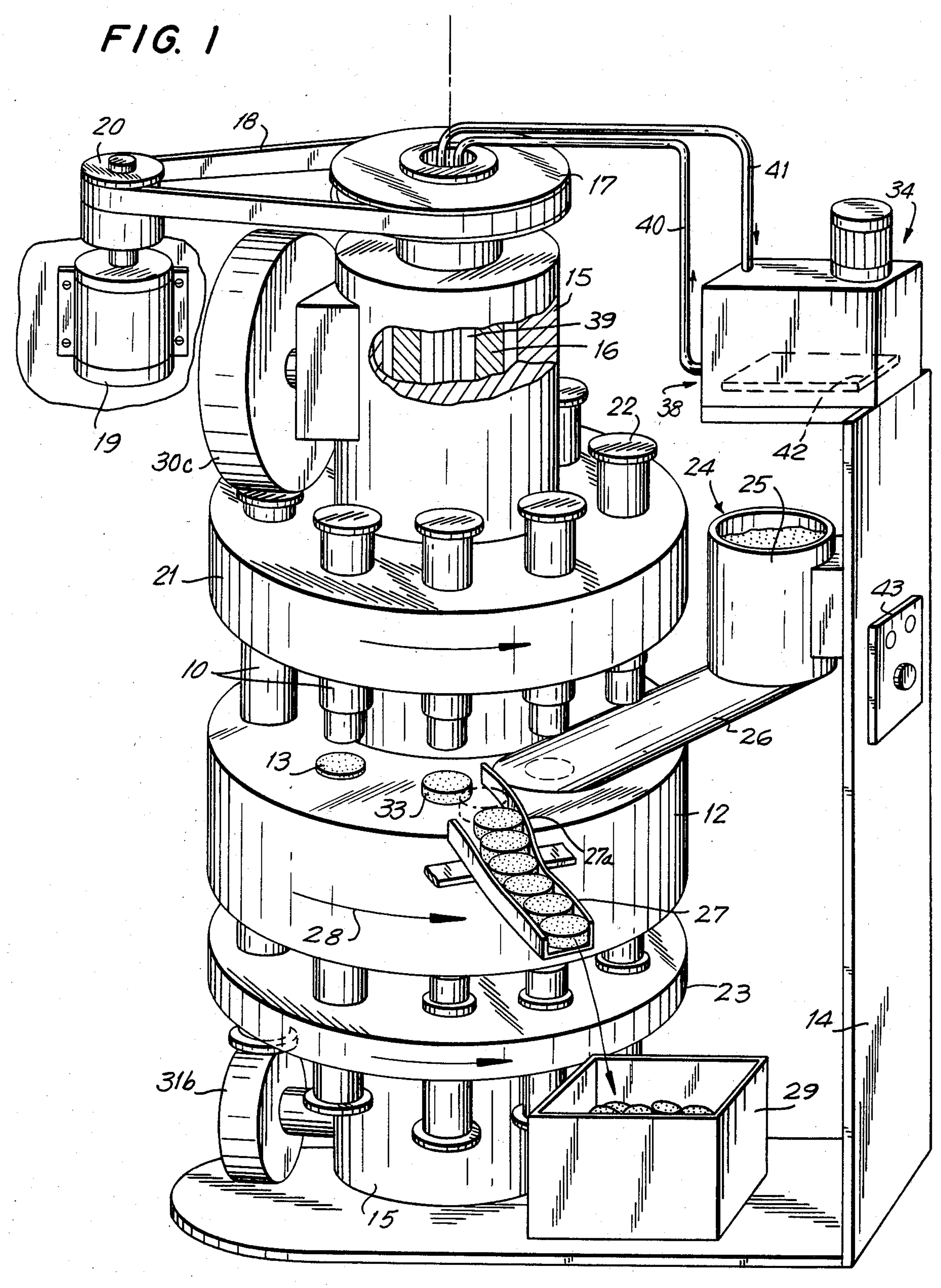
FIG. 1 is a diagramatic, perspective view of one embodiment of the tabletting machine according to the present invention.

Referring to the illustrative embodiments shown in the drawings, FIG. 1 illustrates a rotary tabletting machine of the present invention having conventional upper and lower punches 10 and 11, which are uniaxial and axially driven. The tabletting machine has a conventional die 12 which has through holes in which receive the upper 10 and lower 11 punches during pressing.

The tubular shaft 16 within the tube carrier 15 of the tabletting machine of FIG. 1 is supported on mounting or housing 14 in a conventional way, e.g., on rotatable ball bearings (not shown). The belt pulley 17 is attached to the upper end of the tubular shaft 16 and is connected through belt 18 with the belt pulley 20 of the electric motor 19. Furthermore, the die 12 and the guide disc 21 are connected to the tubular shaft 16 in a conventional way, and turn with the tubular shaft. The guide disc 21 is used for vertically guiding and containing the bases of upper punches 10. In the illustrated embodiment, the upper punches 10 are provided with heads 22, which travel through a forced trajectory in a manner to be described below.

For vertically guiding and housing the lower punches 11 of FIG. 1, the tabletting machine is provided with guide disc 23, which is similarly fixed to the tubular shaft 16 in a conventional manner. The forced trajectories of punches 10 and 11 are not shown in FIG. 1 in order to provide a better overall view.

A granulated matter feeding mechanism 24 is attached to housing 14. This unit 29 consists of a tank 25 and a connected sloping feeding chute 26. The lower end of the feeding chute 26 rests on the upper surface of the die 12 in the area of the rotation path of the holes 13. A sloping tablet collecting trough 27 attached to the housing 14 and is fitted with a small clearance and arm 27*a* to the top of the die. The tablet collecting box 29 is arranged under the trough 27. The feeding chute 26 and trough 27 are arranged in such a way that the tablet lifted out of the hole 13 of the die 12 with the aid of the lower punch 11 is guided with the help of the feeding chute 26 and arm 27*a* into the trough 27. The common direction of revolution of the tubular shaft 16, die 12, and guide discs 21 and 23 is shown by reference number 28 on the drawing of FIG. 1.

One means for obtaining the forced trajectories of the upper 10 and lower 11 punches is clearly shown in FIG. 1. Here, the upper punches 10 follow a cam track 30, which in this case is attached to the tube carrier 15. (The means for attachment is not shown.) The cam track 30 includes the lower guide 30*a*, upper guide 30*b*, and the unit which drives the punches 10 downward for pressing, in this case roller 30*c*, which freely rotates about a horizontal axis (not shown). The cam track of the lower punches 11*a* is shown by reference number 31. In this case, cam track 31 is attached similarly to the tube carrier 15 (attachment not shown) and includes the lower guide 31*a*, cam 31*b* and roller 31*c* which rotates about a horizontal axis (not shown) to drive punches 11 upward.

Figure 2:
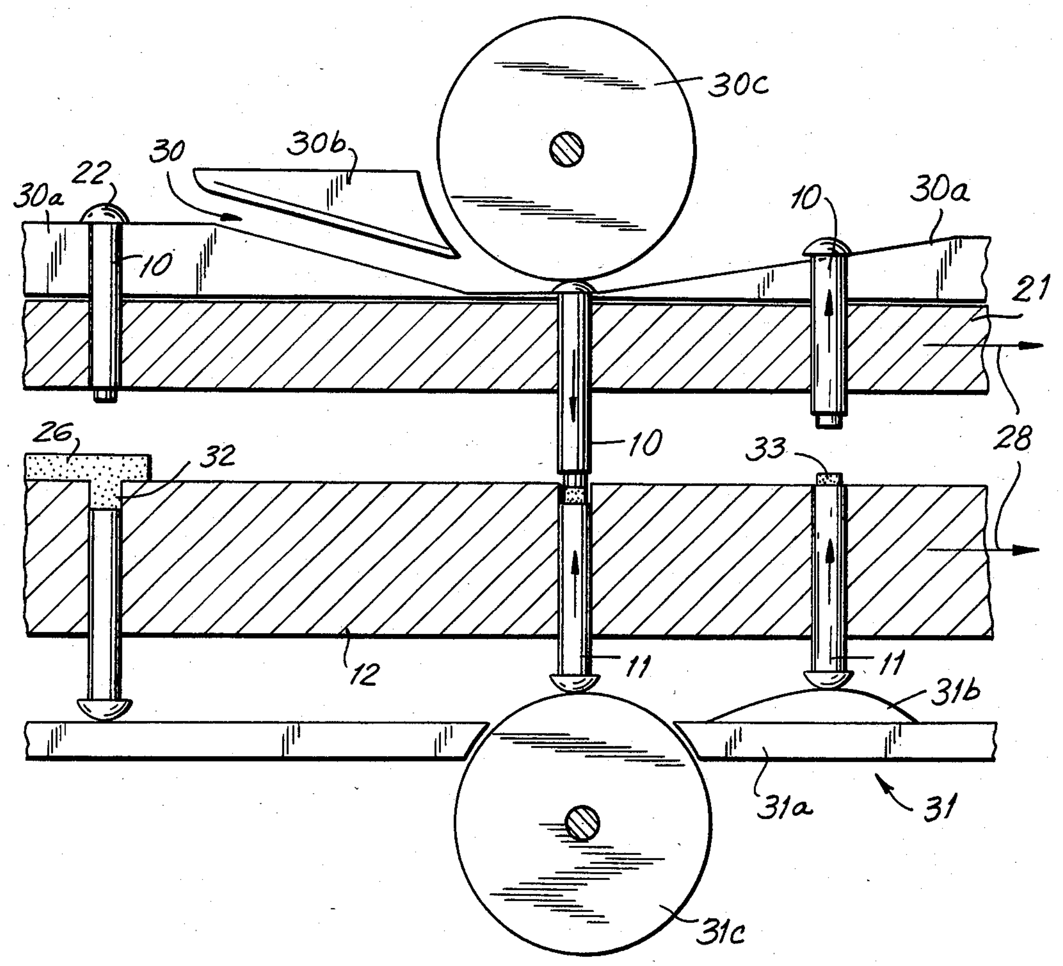
FIG. 2 is a vertical sectional view of the machine of FIG. 1.

The upper punches 10 and lower punches 11 shown on the left side of FIG. 2, are kept in the extreme end positions by the guides 30*a* and 31*a* when the feeding chute 26 feeds the granulated charge into the pressing space 32. The punches 10 and 11 shown in the center of FIG. 2 are forced into the pressing position by rollers 30*c* and 31*c*. At the right hand side of FIG. 2 it is shown how the upper punch 10 is driven upwardly by the rising part of guide 30*a*. At the same time, the cam 31*b*, attached to guide 31*a*, drives the lower punch 11 to its upper position. In this position, the lower punch 11 lifts the finished tablet 33 from the pressing space 32 to the level of the upper plane of the die 12. The apparatus illustrated in to FIG. 2 differs somewhat from the apparatus of FIG. 1 inasmuch as the lower punches 11 are guided in the die 12 and hence, guide disc 23 is not needed in this embodiment.

According to the invention, the tabletting machine is provided with temperature regulating unit 34, the purpose of which is to maintain the predetermined optimal temperature range of the granulated charge during pressing.

Figure 3:
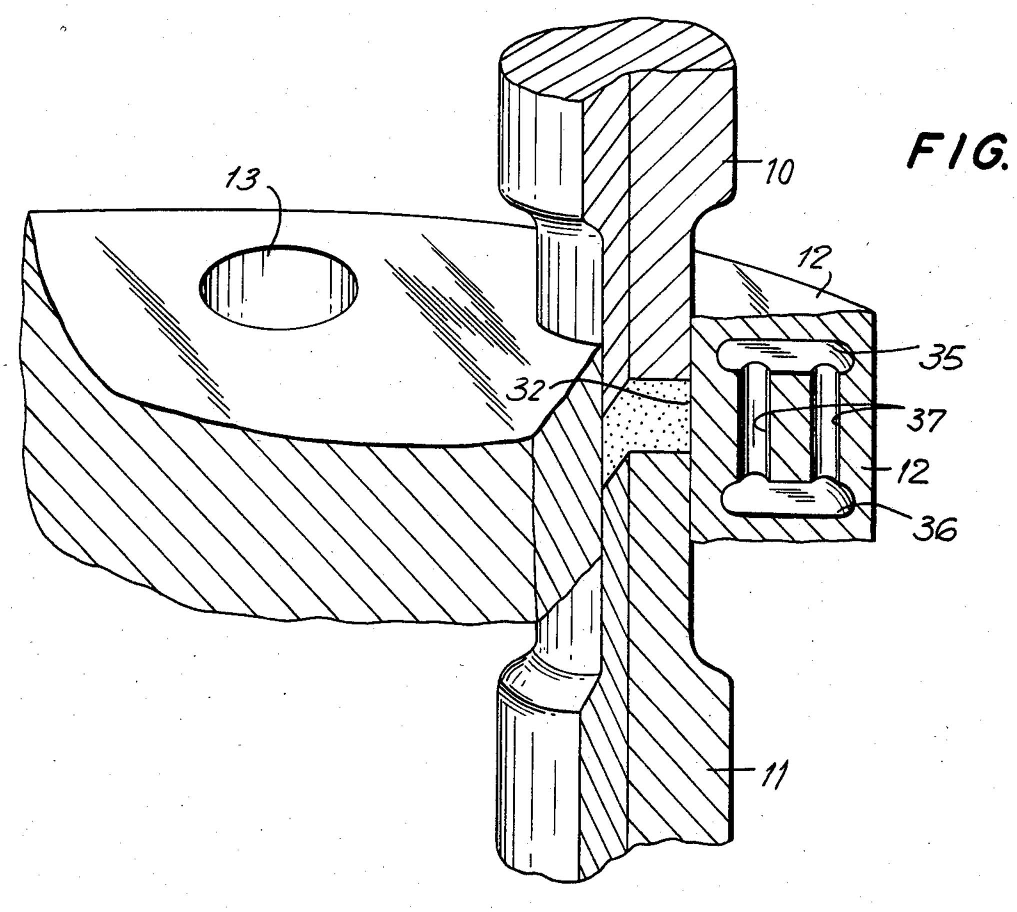
FIG. 3 is a partial sectional view of the machine of FIG. 1 showing means for regulating the temperature.

The first embodiment of regulating unit 34 is shown in FIG. 1. As further illustrated in FIGS. 3 and 4, temperature regulating unit 34 includes annular ducts 35 and 36 formed in the die 12 which are connected to a source of thermal medium of adjustable temperature FIG. 3 shows in detail how the ducts 35 and 36 are connected to each other through holes 37.

Figure 4:
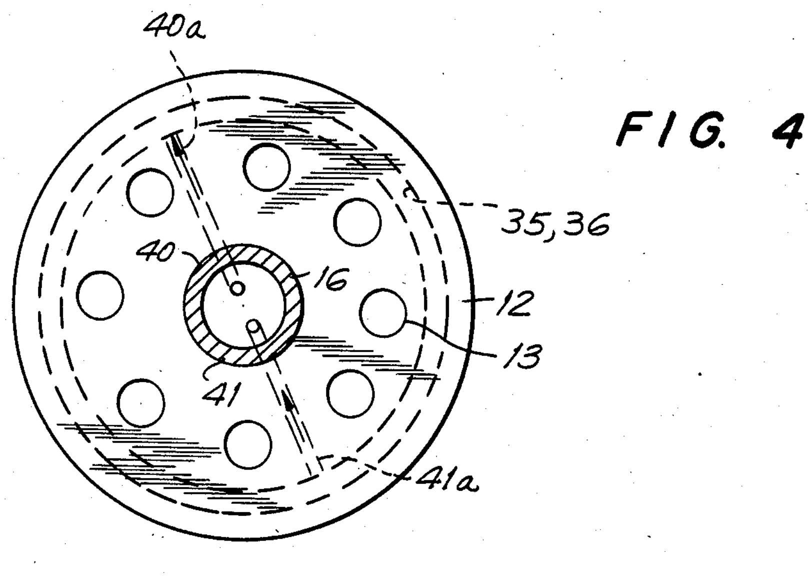
FIG. 4 is a plan view of the matrix of the tabletting machine as shown in FIG. 1.

As shown in FIGS. 1 and 4, pipes 40 and 41 are arranged in the central space 39 of the tubular shaft 16 shown in FIG. 1. These pipes lead into duct 35 through their horizontal branches 40*a* and 41*a* within the die. Either a liquid or a gaseous thermal medium, e.g., water or oil, be introduced into the ducts 35 and 36 from the source of medium via the pipes 40 and 41. The temperature of the medium can be regulated with a conventional heating or cooling unit 42 connected to a control panel 43 in a conventional manner.

Figure 5:
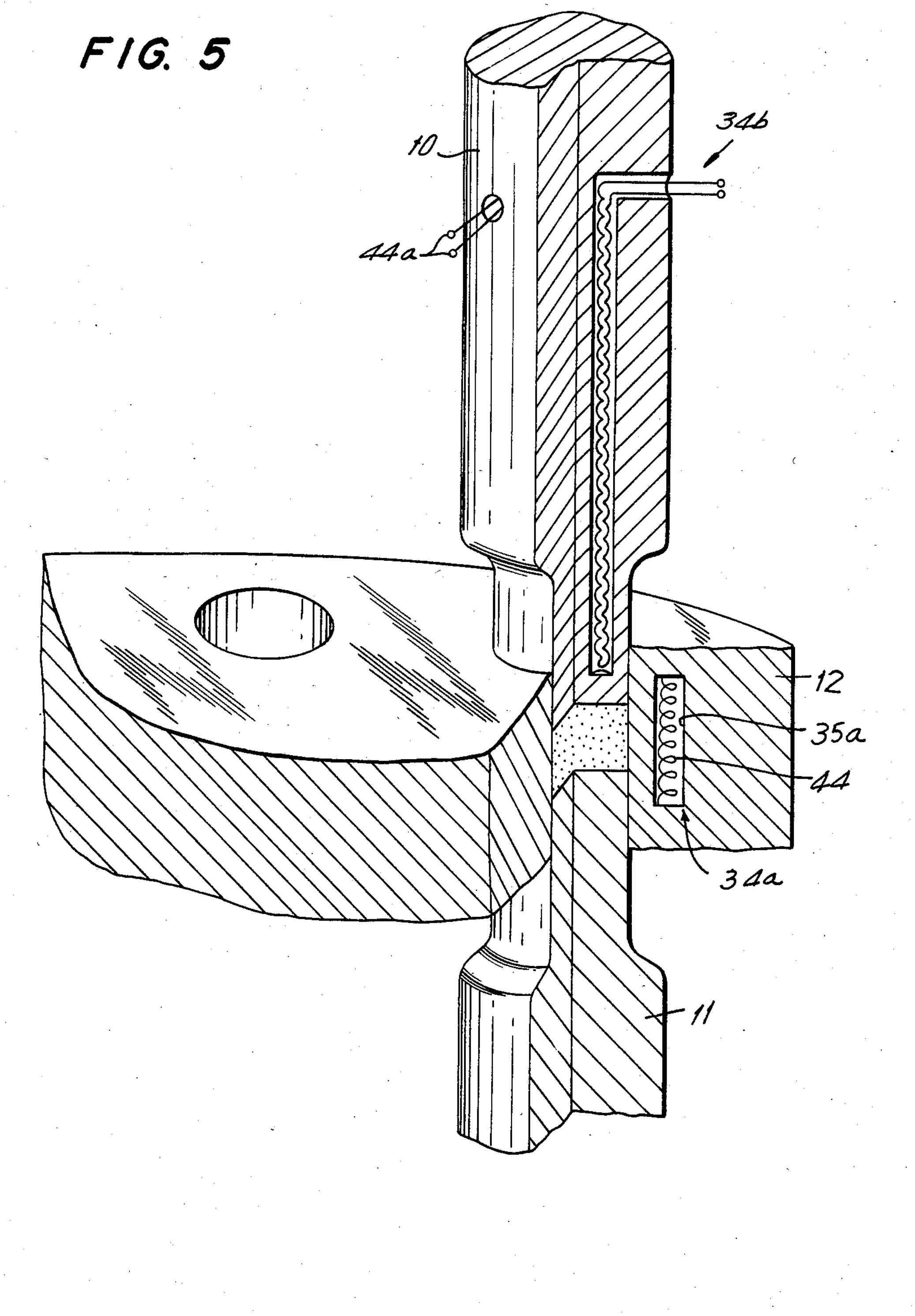
FIG. 5 shows two different embodiments for regulating the temperature of the machine of FIG. 1.

According to the invention, another embodiment of the unit for regulating the pressing temperature is shown in the center of FIG. 5. In that embodiment, an electric heating wire 44 of adjustable temperature is arranged in the duct 35*a* of the die 12. This unit is marked with reference number 34*a*. The supply cables 44*a* of the heating wire 44 can be connected (connection not shown) to the electrical regulating unit through the central space 39 of the tubular shaft 16.

For simplicity's sake, a third embodiment of the temperature regulating unit is also shown in the upper portion of FIG. 5 and marked with reference number 34*b*. Here the upper punch 10 has a duct 45 containing electric heating wires 46 of adjustable temperature. The heating wires 46 are connected to the regulating unit connection (not shown) supplying electricity.

FIGS. 6*a* and 6*b* show yet another temperature regulating unit 34*c* controlling the pressing temperature by providing a heating or cooling unit 47 which surrounds the upper punch 10 in it supper end position. This unit has an annular cavity 49 in a cylindrical housing 48 connected to a source of thermal medium (not shown) whose temperature can be controlled. This construction allows the temperature of the upper punch 10, and therefore the pressing temperature, to be adjusted by convection. In this case the heat transfer to the punch 10 takes place while the punch is in the upper end position shown in FIG. *6a*. The pressing position is shown in FIG. *6b*.

Figure 7:
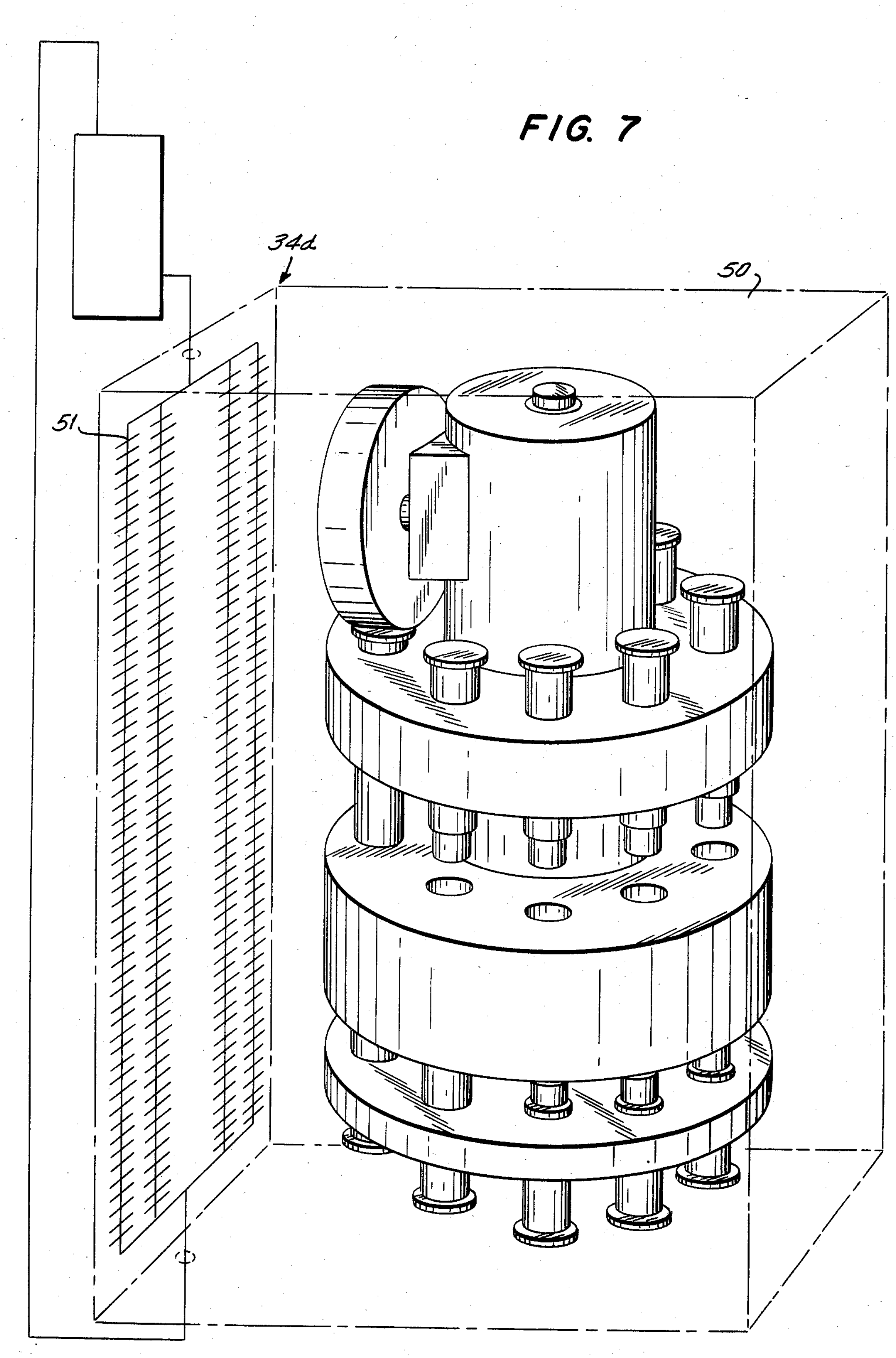
FIG. 7 is a perspective view of another embodiment of the tabletting machine of the present invention.

Finally, FIG. 7 is an illustration of another embodiment of the tabletting machine of the present invention where the temperature regulating unit 34 regulates the pressing temperature by means of a chamber 50 which surrounds the entire tabletting machine. This chamber 50 is associated with heating or cooling unit 51 which maintains the required operating temperature of the entire tabletting machine at all times. In the embodiment shown in FIG. 7, like numbers are used to correspond with the prior drawings.

It is possible that the desired results can be obtained through various combinations of the suggested heat regulating units. It is also possible to obtain the desired results by regulating the temperature directly of the granulated charge through the use of a heating or cooling unit.

Best Mode Of Carrying Out The Invention

The experiments conducted with regard to this invention can be illustrated in the following three examples:

EXAMPLE 1

Tabletting of granulated matter requiring minimal moisture content for stability is carried out with a rotating tabletting machine equipped with temperature regulating unit 34*a*. 100 kg of acetylsalicylic acid of 0.32 mm mesh size sieve fineness, and 8.7 kg dried potato starch of 4–6% moisture content were homogenized by conventional method. This was followed by mixing a homogenized powdery mixture of talc and 2.5 kg of stearine of 0.06 mm mesh size sieve fineness with the previously prepared mixture.

200,000 tablets of good quality were then pressed from this granulated matter of about 0.5% moisture content, at a preliminary pressing temperature of 45±2° C. with about 1000 kp/cm$^2$ pressure.

EXAMPLE 2

Tablet pressing was performed with the tablet pressing machine shown in FIGS. 1, 3 and 4. 40 kg of papaverinechloride and 15 kg of potato starch were first granulated and mixed with a solution of 3 kg polyvinyl pirrolydone and 8 kg of water. This was then dried and after regranulation, was mixed with a powdery mixture of 1.5 kg talc and 1.5 kg magnesium stearate. Tablets were then pressed with said tabletting machine at a regulated pressing temperature of 27±2° C. and at a pressure of 900 kp/cm . The quality of the tablets according to the control tests was found to be excellent.

EXAMPLE 3

So-called direct tabletting of active ingredients without additives was carried out with a tabletting machine according to the invention. One weight fraction of 1.2–5.6 dianhydro-dulcite was dissolved in two weight fractions of water-free menthol at 50° C. temperature. The solution was filtered while hot and allowed to stand for 24 hours at 23±2° C. The separated crystals were filtered and dried in one Hg mm vacuum at 30° C. until a stable weight was achieved. This resulted in a mixture of monoclinic and triclinic crystal forms having a melting point of 100°–102° C. The grain size distribution of the recrystalized polymorphous mixture was optimal for direct tabletting when 85–90% of the mixture was 0.6–0.8 mm in size, and the moisture content did not exceed 0.2%.

Under the above conditions 100 mg soluble tablets were pressed from 1.2–5.6 dianhydro-dulcite basic material, free of additives, with 5 mm diameter dies at 900±100 kp/cm$^2$ pressure at the preregulated pressing temperature of 32±2° C. At a lower temperature the tablets split into plates, and at a higher temperature the tablets remain stuck to the die, neither case being satisfactory.

In accordance with the present invention, sterile soluble tablets can be produced which are suitable for injection and dispensing in rubber capped ampoules while meeting accepted standards for aseptic drug production. Dispersion of these tablets can be kept within the permissible range of tolerance.

What is claimed is:

1. A process for producing biological, pharmaceutical or edible tablets of uniform quality with minimal waste from a supply of granulated particles, comprising:

(a) introducing a charge of said granulated particles into a die cavity between opposed movable punches within a tabletting press;

(b) moving the two punches toward each other to contact, compress, and bond the granulated particles into a consolidated tablet;

(c) maintaining the temperature of the granulated particles during step (b) at a predetermined value within a range of about 15° to 50° Celsius; and (d) moving the opposed punches apart and removing the formed tablet.

2. The process according to claim 1 in which said granulated particles are a pharmacalogically active material comprising dianhydro-dulcite without any carrier or dilutent and wherein the temperature at which the dianhydro-dulcite is maintained during the compressing step (b) is between 30° and 34° Celsius.

* * * * *